US008564407B2

(12) United States Patent
Lin et al.

(10) Patent No.: US 8,564,407 B2
(45) Date of Patent: Oct. 22, 2013

(54) UNIVERSAL INFRARED RECEIVING APPARATUS AND ASSOCIATED METHOD

(75) Inventors: Yu-Ming Lin, Hsinchu Hsien (TW); Kun-Nan Cheng, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 181 days.

(21) Appl. No.: 12/855,800

(22) Filed: Aug. 13, 2010

(65) Prior Publication Data

US 2011/0050450 A1 Mar. 3, 2011

(30) Foreign Application Priority Data

Sep. 2, 2009 (TW) ............................... 98129588 A

(51) Int. Cl.
*G08B 5/22* (2006.01)
*H04Q 1/30* (2006.01)

(52) U.S. Cl.
USPC ..................... 340/7.34; 340/825.62; 398/107; 398/155; 398/202; 365/233.11

(58) Field of Classification Search
USPC ........................................... 340/825.62, 7.34
See application file for complete search history.

(56) References Cited

U.S. PATENT DOCUMENTS 4,992,775 A * 2/1991 Castle et al. .................. 340/525
5,579,057 A * 11/1996 Banker et al. ................. 348/589
6,956,496 B1 * 10/2005 Herz ............................ 340/4.33
2003/0197625 A1 * 10/2003 Szuba ...................... 340/825.69
2005/0225445 A1 * 10/2005 Petersen et al. ............ 340/568.2
2006/0143572 A1 * 6/2006 Scott et al. ..................... 715/765
2006/0232900 A1 * 10/2006 Takeuchi et al. ................ 361/90
2009/0028568 A1 * 1/2009 Flachs et al. .................. 398/106

FOREIGN PATENT DOCUMENTS

CN 1484381 A 3/2004
CN 1912948 A 2/2007

OTHER PUBLICATIONS

Chinese Office Action dated Jun. 28, 2013, 4 pages.

* cited by examiner

*Primary Examiner* — George Bugg
*Assistant Examiner* — Anthony D Afrifa-Kyei
(74) *Attorney, Agent, or Firm* — Edell, Shapiro & Finnan, LLC

(57) ABSTRACT

A universal infrared receiving apparatus is provided. The universal infrared receiving apparatus includes a slicer, a non-volatile memory, a volatile memory and a comparison apparatus. The slicer slices a remote control command waveform into digital waveform data. The non-volatile memory pre-stores target waveform data. The volatile memory stores the digital waveform data and the target waveform data. The comparison apparatus, coupled to the volatile memory, compares the digital waveform data and the target waveform data to generate a comparison result.

20 Claims, 9 Drawing Sheets

UNIVERSAL INFRARED RECEIVING APPARATUS AND ASSOCIATED METHOD

CROSS REFERENCE TO RELATED PATENT APPLICATION

This patent application is based on Taiwan, R.O.C. patent application No. 098129588 filed on Sep. 2, 2009.

FIELD OF THE INVENTION

The present invention relates to an infrared receiving apparatus and associated method, and more particularly to a universal infrared receiving apparatus and associated method.

BACKGROUND OF THE INVENTION

As electronic technologies progress, all kinds of electronic devices are steadily becoming a part of everyday life in a modern society. Many consumer electronic products, such as televisions, digital video disc (DVD) players, and multi-function digital media players are being extensively utilized by the public. In order to allow a user to enable selected functions of the consumer electronic products, many consumer electronic products rely on a remote control.

A conventional infrared (IR) remote control system allows one-to-one control of the electronic device. In other words, every electronic device must have its own corresponding remote control. Further, each function that the remote control manages is governed by a remote control signal that contains information associated with the function. The remote control has many buttons, each of which controls one of the functions. To enable or initiate a certain function of the electronic device, one must press the corresponding button to send the remote control signal containing the information associated with that function. When the electronic device receives the remote control signal, the electronic device extracts the information from the remote control signal and performs the function corresponding to the information in the remote control signal.

Generally speaking, the remote control employs either infrared or radio frequency technology for transmission. Apart from providing omnidirectional transmission, the radio frequency technology is also bi-directional, meaning that it not only sends but is also capable of receiving signals containing, e.g., status information of household appliances to display the same on a display of the remote control. Infrared technology has advantages of having a smaller size, lower power consumption and low cost. Thus, remote controls that employ infrared technology are dominant in the remote control market.

FIG. 1 is a diagram of a conventional infrared remote control system 10. The infrared remote control system 10 comprises a transmitting end 12 and a receiving end 14. The transmitting end 12 comprises an input interface 120, an encoding module 122, and an infrared transmitter 126. The receiving end 14 comprises an infrared receiver 140, a control module 144, and a function module 146. At the transmitting end 12, the input interface 120 comprises a plurality of buttons corresponding to different functions, and one can press the buttons to perform functions of the electronic device. The encoding module 122 converts an output of the input interface 120 to a binary signal, which may include a header or padding bits according to a predetermined rule in order to produce a packet complying with a predetermined format. The packet is then transmitted to the receiving end 14 through an infrared beam by the infrared transmitter 126. At the receiving end 14, the infrared receiver 140 converts the infrared beam from the infrared transmitter 126 to an electronic signal through an optical-to-electrical conversion process. The control module 144 comprises a microcontroller 148 and a memory 150 for demodulating, decoding, and identifying the control signal sent by the transmitting end 12. The control module 144 down-converts the control signal carried by the infrared beam to a baseband signal in order to identify a control command from the transmitting end 12 and to execute corresponding functions F(1) . . . F(n) associated with the control command through the function module 146.

In the infrared remote control system 10, since only a small amount of information is transmitted from the transmitting end 12 to the receiving end 14, accuracy is the most important consideration when transmitting the information. Many encoding standards have been developed in the prior art. The most prevalent standards are RC-5 standard and RECS80 standard in Europe, and NEC standard in Asia. Additionally, many consumer electronics manufacturers including as Mitsubishi, Panasonic, and JVC, have developed their own proprietary encoding schemes. These encoding schemes can be roughly divided into three modulation methods: phase modulation, pulse width modulation, and pulse position modulation. FIGS. 2-4 are waveforms corresponding to phase modulation, pulse width modulation, and pulse position modulation, respectively. Phase modulation represents a falling edge within a unit time interval by a "0" and a rising edge within the unit time interval by a "1". In pulse width modulation, the pulse width determines a "0" and a "1" by a ratio of the high level to the low level for a transmitted infrared carrier modulation (a working period). For example, in the NEC encoding standard, "0" represents a pulse that is at the high level for 0.56 ms and at the low level for 0.56 ms, and "1" represents a pulse that is at the high level for 0.56 ms and at the low level for 1.68 ms. Thus, pulse position modulation represents pulses occurring in different positions relative to a reference pulse position by "0" and "1".

In view of the above modulation methods, the control module 144 requires different demodulation and decoding methods to obtain the control command sent by the transmitting end 12. Taking the pulse width modulation as an example, the microcontroller 148 of the control module 144 uses an internal clock to measure a high period and a low period to identify "0" and "1" of the received signal. In other words, a decoding process according to the prior art requires the internal clock of the microcontroller 148. Generally speaking, in multimedia devices, in addition to demodulation and decoding, the microcontroller 148 is also used for video and audio processing. Thus, in the prior art, due to the resource consumption on the microcontroller 148 by the internal clock needed for the decoding process, the efficiency of the video and audio processing performed by the microcontroller 148 is lowered while also deteriorating the multimedia output quality. Further, unsatisfactory design flexibility is allowed for system manufacturers in view that many of the above decoding standards are realized by the conventional remote control system developed from proprietary hardware. For example, since infrared systems with proprietary decoding schemes are implemented by system manufacturers, an infrared receiver required by LCD televisions that are sold all over the world may encounter standard compliance complications in different parts of the world.

Furthermore, modern electronic products strive for power saving. When the electronic product is in a "sleep" mode, it is desirable to reduce the system power consumption as much as possible. It is noted that, when the system is in the sleep mode, awaking the system through hardware is more power saving but less flexible than through software. More specifically, in the prior art, awaking the system through hardware requires different hardware structures corresponding to different remote control manufacturers, such that system manufacturers are given unsatisfactory flexibility and hardware failures may be caused. However, in the prior art, although awaking the system through software yields better flexibility as an advantage, power consumption in a standby mode meanwhile gets too large.

Hence, there is a desire for an improved universal infrared receiving apparatus and associated method.

SUMMARY OF THE INVENTION

It is one of the objectives of the present invention to provide a universal infrared receiving apparatus and associated method for universally adapting to remote controls of various manufacturers without needing to change the hardware structure.

The invention provides a universal receiving apparatus comprising a slicer, for slicing a remote control command waveform to digital waveform data; a non-volatile memory, for storing target waveform data; a volatile memory, for storing the digital waveform data and the target waveform data; and a comparison apparatus, coupled to the volatile memory, for comparing the digital waveform data with the target waveform data to generate a comparison result.

The invention further provides an infrared receiving method comprising receiving a remote control command waveform; slicing the remote control command waveform to digital waveform data; and comparing the digital waveform data with target waveform data to generate a comparison result.

Moreover, the invention further provides an infrared waveform recording method comprising receiving a remote control command waveform; slicing the remote control command waveform to digital waveform data; storing the digital waveform data as the target waveform data in a volatile memory; and non-volatily storing the target waveform data in a non-volatile memory.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE PREFERRED EMBODIMENT

Figure 1:
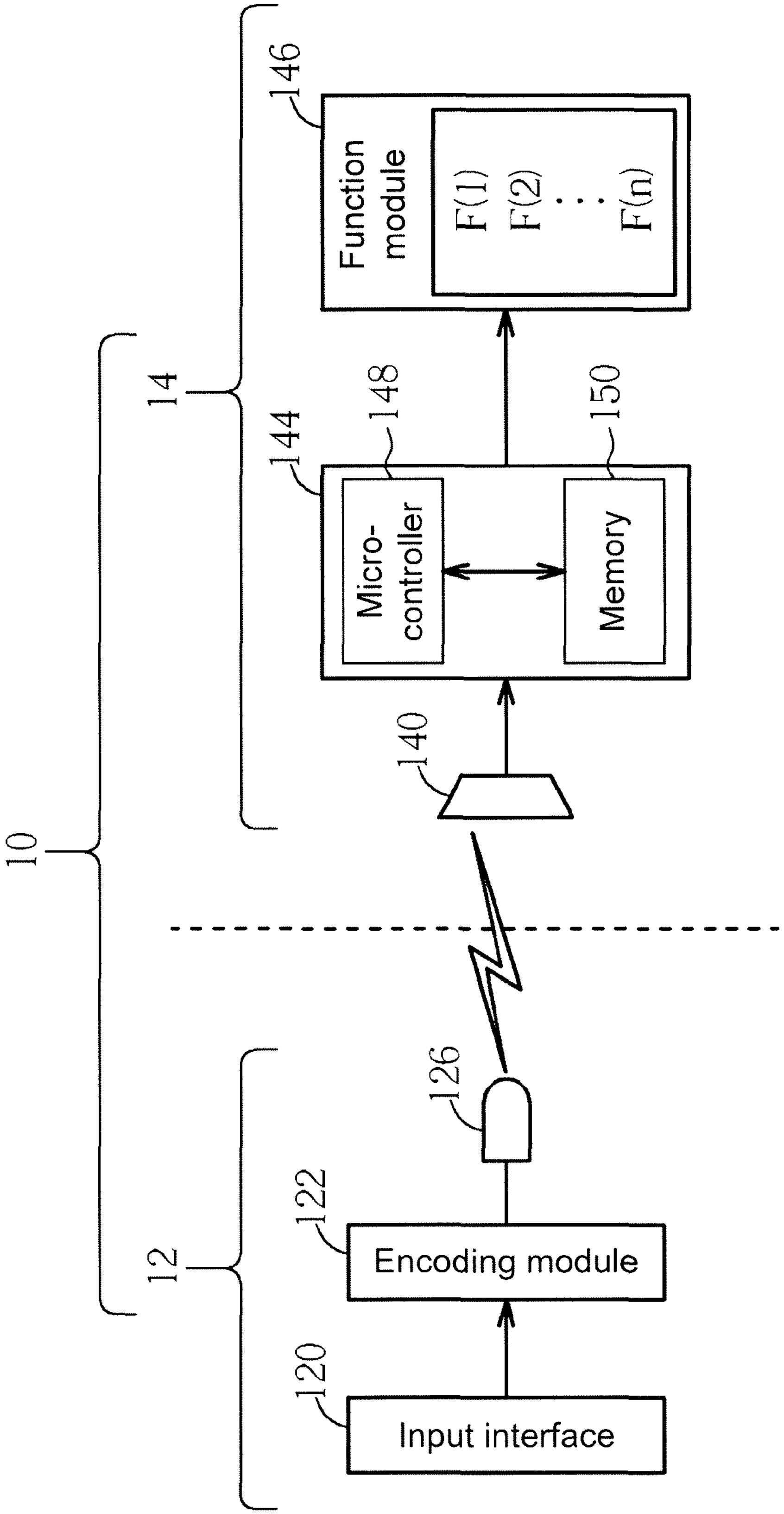
FIG.1 (Prior Art)
FIG. 1 is a diagram of a conventional infrared remote control system.
Figure 2:
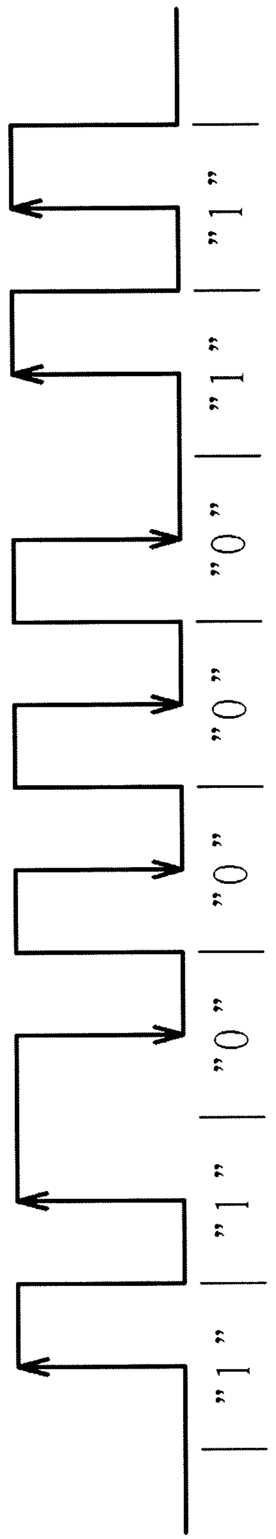
FIGS. 2-4 are waveforms corresponding to phase modulation, pulse width modulation, and pulse position modulation, respectively.
Figure 3:
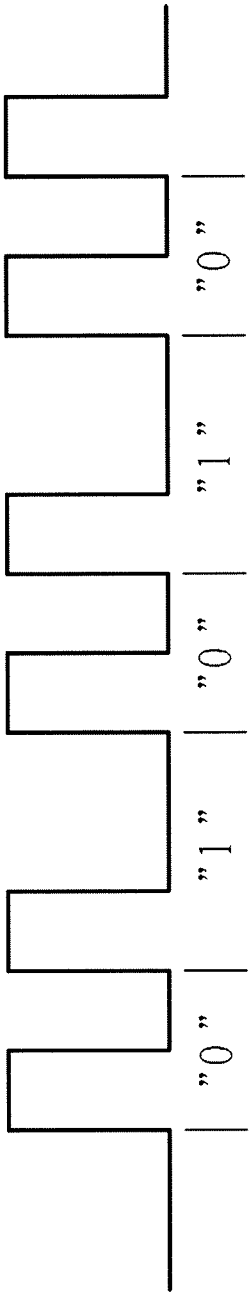
Figure 4:
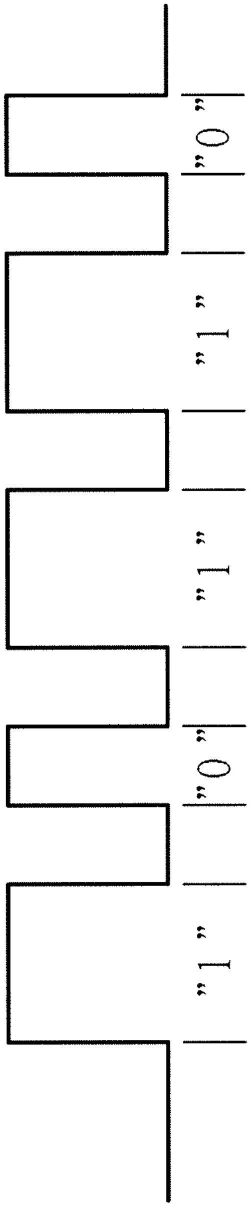
Figure 5:
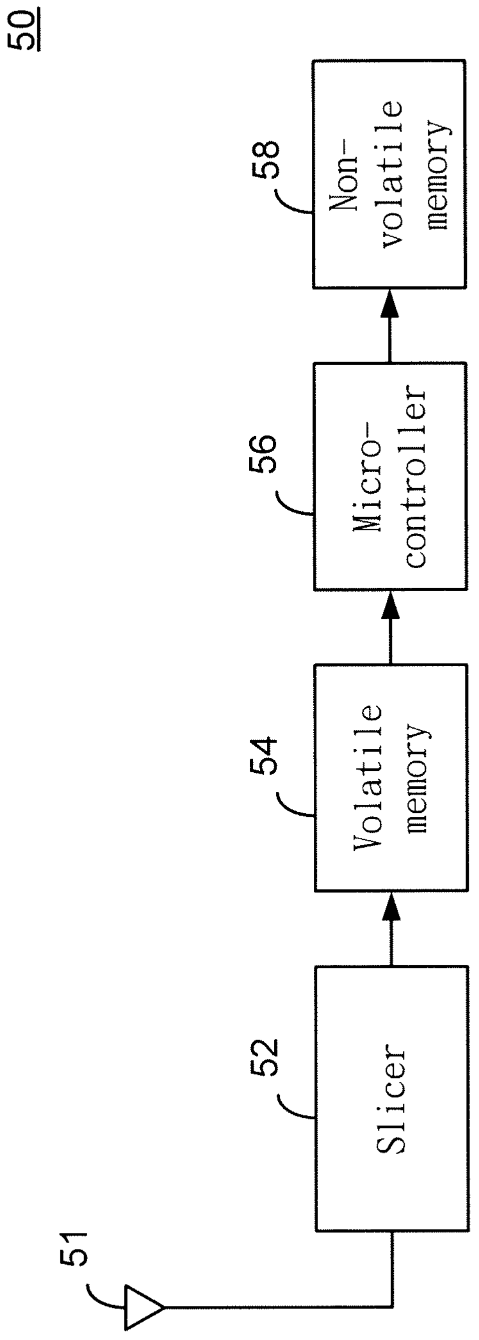
FIG. 5. is a block diagram of a universal infrared receiving apparatus according to one embodiment of the present invention.

FIG. 5 is a block diagram of a universal infrared (IR) receiving apparatus 50 according to one embodiment of the present invention. The universal IR receiving apparatus 50 comprises an IR receiver 51, a slicer 52, a volatile memory 54, a microcontroller 56 and a non-volatile memory 58. For example, the volatile memory 54 is a static random access memory (SRAM) or is realized by a flip-flop. The microcontroller 56 may be a microprocessor. The non-volatile memory 58 may be a read-only memory (ROM) or a flash memory.

In this embodiment, the universal IR receiving apparatus 50 is capable of awaking a system from a sleep mode as well as ensuring that the awakening mechanism functions well. For example, the system may be a television (TV), a digital video disc (DVD) player, audio equipment or an air conditioner. The same hardware according to the embodiment is then provided by a chip provider to different remote control manufacturers, and it is assured that the hardware functions properly under various signal standards. Hence, for the chip provider, the universal IR receiving apparatus according to the embodiment of the invention offer advantages of having better flexibility and reduced costs for chip providers.

In this embodiment, the IR receiver 51 receives and demodulates an IR modulated waveform to generate a remote control command waveform. For example, by using a reference IR remote control (not shown) in normal operation, one presses a predetermined key on the remote control to transmit the corresponding IR modulated waveform. The IR receiver 51 (depicted as an antenna in FIG. 5) receives and demodulates the IR modulated waveform to generate the remote control command waveform, which is then sliced to digital waveform data by the slicer 52. Preferably, the digital waveform data is converted from serial to parallel and stored to the volatile memory 54. Since the volatile memory 54 operates in a unit of bytes but the IR receiver operates with a lower transmission rate in a unit of bits, the waveform data is converted from serial to parallel to benefit data processing. Preferably, the volatile memory 54 and the slicer 52 operate according to a first clock of a lower speed. For example, the first clock is a slow clock of 4 MHz. The first clock usually need not be too high for power saving considerations.

After the sliced remote control command waveform data is stored to the volatile memory 54, a proceeding process can be carried out with a clock of a higher speed. Preferably, one can adjust the clock of the volatile memory 54 from the lower first clock to a higher second clock that is the same as the microcontroller 56, such as 14.318 MHz, to facilitate the microcontroller 56 to control the volatile memory 54 to operate in cooperation. Those skilled in the art understand that the above processes can all be carried out with the same clock. For example, the lower clock can be implemented for power saving considerations, whereas the higher clock can be implemented for rate or efficiency considerations.

In this embodiment, one can use the microcontroller 56 to read the digital waveform data in the volatile memory 54 and store it as a target waveform data to the non-volatile memory 58, which retains the target waveform data even after the system is not powered. When the system is again powered on, the target waveform data stored in the non-volatile memory 58 is read to another volatile memory and compared to determine whether to awaken the system or perform the system operation in response to the remote control command waveform. On the remote control, the same predetermined key that is pressed for storing the target waveform data can also be pressed to awaken the system or perform the system operation. For example, when the television is produced at a manufacturer's end, supposing a power key and a volume control key are recorded as the target waveform data in the non-volatile memory, one can then press the power key to awaken the television system from the sleep mode to adjust the volume at an end-consumer's end.

Figure 6:
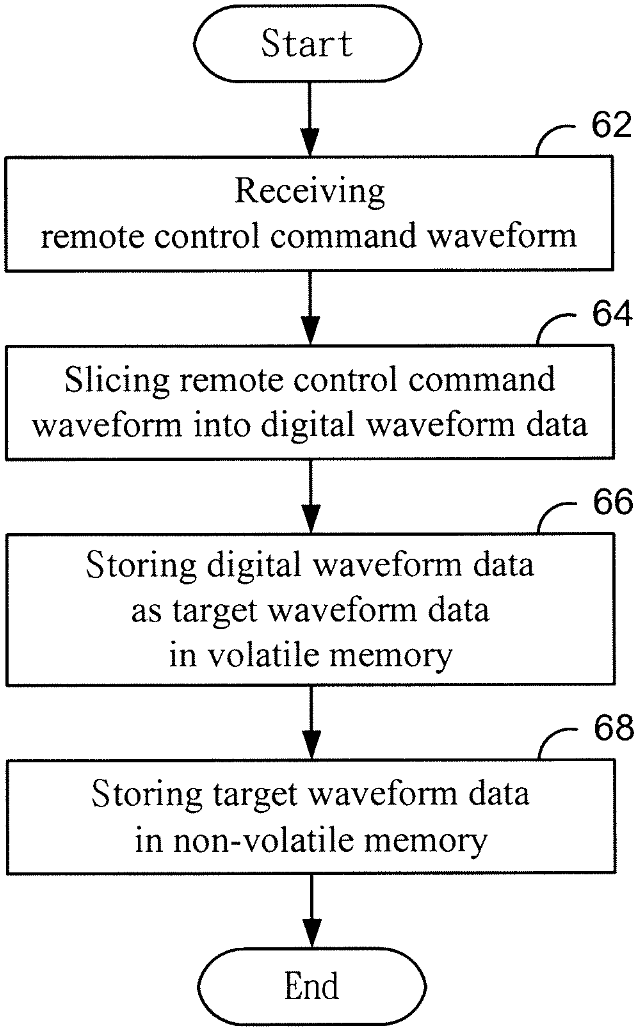
FIG. 6 is a flowchart of a method for recording IR waveform according to one embodiment of the present invention.

FIG. 6 is a flowchart of a method for recording IR waveform according to one embodiment of the present invention. First, in Step 62, the remote control command waveform is received. For example, a predetermined key on a reference IR remote control (not shown) in normal operation is pressed to transmit a corresponding IR modulated waveform, which is then received by the IR receiving apparatus. The IR receiving apparatus demodulates the IR modulated waveform to generate the remote control command waveform. In Step 64, the remote control command waveform is sliced into digital waveform data. Preferably, the digital waveform data is converted from serial to parallel, and is operated by a higher clock frequency adjusted from a lower clock frequency. In Step 66, the digital waveform data is stored as the target waveform data in a volatile memory. In Step 68, the target waveform data is transferred to be stored in a non-volatile memory. For example, a waveform corresponding to a predetermined remote control command, or called a reference remote control command waveform, is stored as the target waveform data to the non-volatile memory. When the system is again powered on, the target waveform data is read from the non-volatile memory to the volatile memory for further operation.

Figure 7:
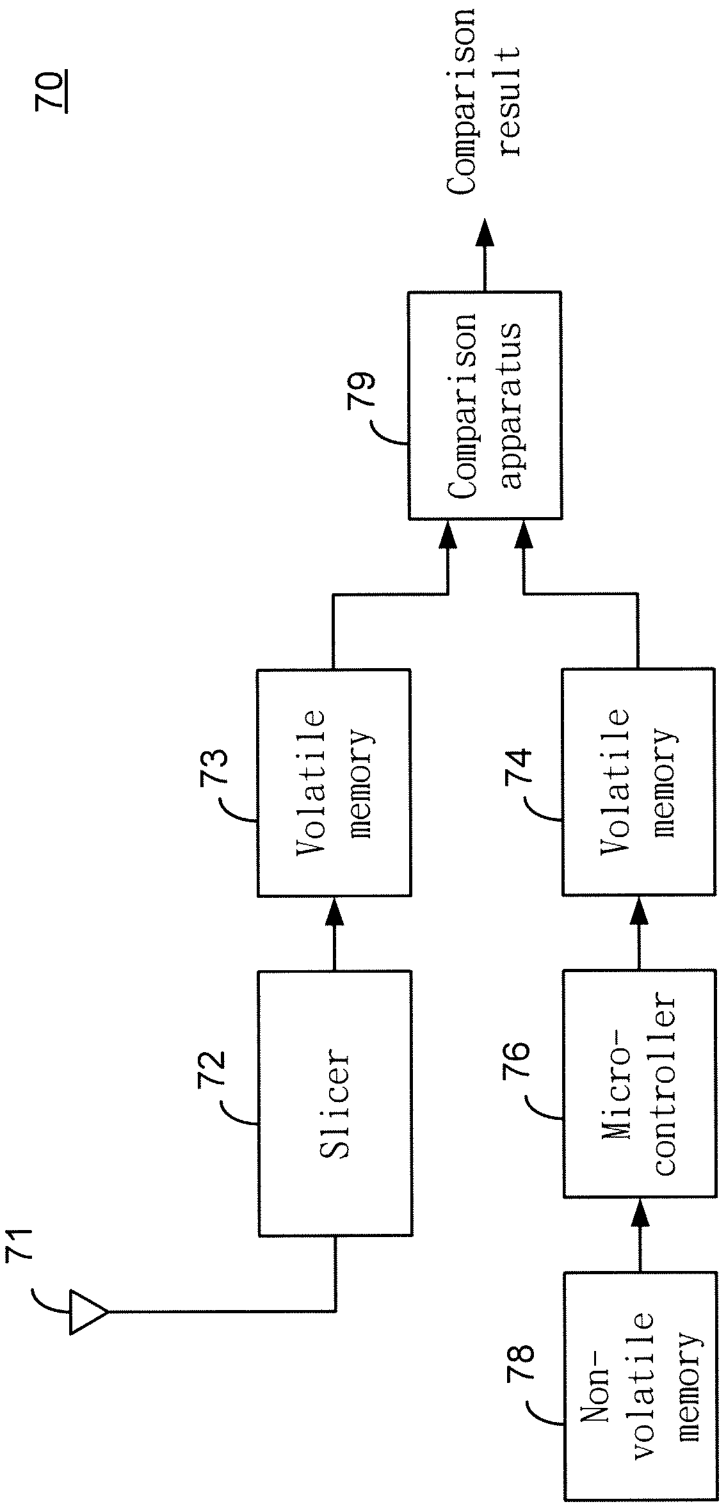
FIG. 7 is a universal IR receiving apparatus according to one embodiment of the present invention.

FIG. 7 is a universal IR receiving apparatus according to one embodiment of the present invention. The universal IR receiving apparatus 70 comprises an IR receiver 71 (again, shown only as an antenna in the drawing), a slicer 72, volatile memories 73 and 74, a microcontroller 76, a non-volatile memory 78 and a comparison apparatus 79. The IR receiver 71 receives and demodulates an IR modulated waveform to generate a remote control command waveform, and then the slicer 72 slices the remote control command waveform to digital waveform data. Preferably, the digital waveform data can be converted from a serial format to a parallel format through a serial-to-parallel apparatus (not shown), and is stored to the volatile memory 73. Since the volatile memory 73 can be accessed in a unit of bytes, which is a higher transmission rate compared to that of and the IR receiver operating in a unit of bits, the digital waveform data is converted from the serial format to the parallel format to benefit data processing. Preferably, for power saving consideration, the volatile memory 73 and the slicer 72 may operate according to a lower first clock, of which the frequency need not be too high. Those skilled in the art can easily appreciate that the above processes can all be operated with the same clock. For example, for the above processes, the lower frequency clock can be implemented for power saving considerations, whereas the higher frequency clock can be implemented for rate or efficiency considerations.

Then, the target waveform data stored in the non-volatile memory 78 in advance is transferred to the volatile memory 74 through the microcontroller 76. The amount of target waveform data stored can be determined according to actual needs, and capacities of the volatile memory 74 and the non-volatile memory 78 can then be accordingly increased or decreased. For example, if three target waveform data are to be stored, the three target waveform data can be stored in the volatile memory 74 in advance. Preferably, the volatile memory 74 storing the three target waveform data can be provided in an application chip circuit. For example, supposing one target waveform data is 16 bytes, three target waveform data shall need a memory size of 48 bytes to slightly increase the circuit cost in the chip circuit.

When the digital waveform data and the target waveform data are both stored in the volatile memory, the target waveform data stored in the volatile memory 74 is compared with the digital waveform data stored in the volatile memory 73 via the comparison apparatus 79 to output a comparison result. When the digital waveform data stored in the volatile memory 73 is the same as the target waveform data stored in the volatile memory 74, the system awakens from the sleep mode through an awakening circuit (not shown) coupled to the comparison apparatus 79, or else it continues to stay in the sleep mode.

Figure 8:
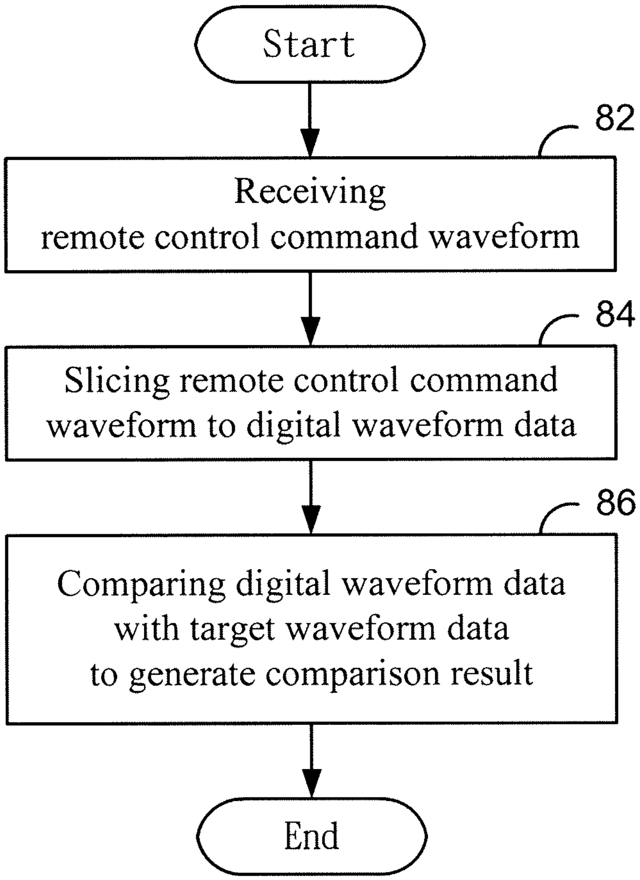
FIG. 8 is a flowchart of a universal IR receiving method according to one embodiment of the present invention.

FIG. 8 is a flowchart of a universal IR receiving method according to one embodiment of the present invention. In Step 82, a remote control command waveform is received. For example, a predetermined key on a reference IR remote control (not shown) in normal operation is pressed to transmit a corresponding IR modulated waveform, which is received by the IR receiving apparatus. The IR receiving apparatus then demodulates the IR modulated waveform to generate the remote control command waveform. In Step 84, the remote control command waveform is sliced to digital waveform data. Preferably, the digital waveform data can be converted from a serial format to a parallel format, and the parallel format can be adjusted from a lower clock to a higher clock. In Step 86, the digital waveform data is compared with the target waveform data to generate a comparison result. For example, when the digital waveform data stored in the volatile memory is the same as the target waveform data stored in the volatile memory, the system awakens from the sleep mode, or else it continues to stay in the sleep mode. According to the above, those skilled in the art can easily appreciate that the remote control command waveform can also be compared with a plurality of target waveform data to generate comparison results that are further provided to the microcontroller for subsequent processing. For example, by sequentially pressing number buttons 1 and 4 as well as an enter button on the television remote control, the system performs corresponding operation of switching the channel, rather than performing the corresponding operation immediately upon pressing the number button 1.

Figure 9:
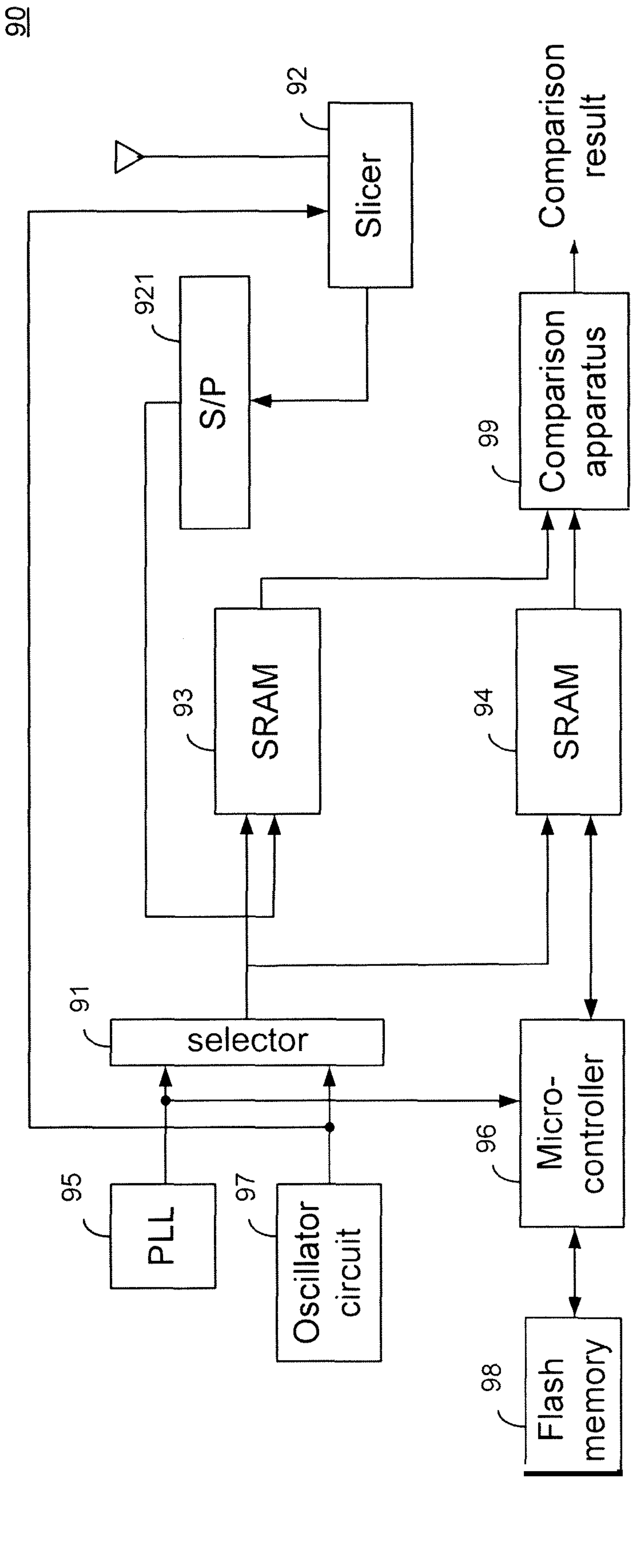
FIG. 9 is a block diagram of a universal IR receiving apparatus according to another embodiment of the present invention.

FIG. 9 is a block diagram of a universal IR receiving apparatus 90 according to another embodiment of the present invention. The apparatus 90 comprises a selector 91, a slicer 92, a serial-to-parallel signal apparatus 921, static random access memories (SRAM) 93 and 94, a phase lock loop (PLL) 95, a microcontroller 96, an oscillator circuit 97, a flash memory 98 and a comparison apparatus 99. Preferably, the selector 91 can be realized by a multiplexer, the microcontroller 96 can be an 8051 microprocessor, the oscillator circuit 97 can be formed by a resistor and a capacitor, and the comparison apparatus 99 can be realized by a single comparator or a plurality of comparators.

In this embodiment, the universal IR receiving apparatus 90 operates in two modes—a sleep mode and a normal mode. For power-saving purposes, the sleep mode can operate in a lower frequency, such as the above first clock. For a more powerful operating capability, the normal mode operates in a higher clock, such as the above second clock. In this embodiment, through the selector 91, an appropriate frequency is selected from the two frequencies of 14.318 MHz and 4 MHz respectively provided by the PLL 95 and the oscillator circuit 97 for the IR receiving apparatus 90.

First, the target waveform data pre-stored in the flash memory 98 is stored to the SRAM 94 by the microcontroller 96 and is compared with the digital waveform data stored in the SRAM 93 via the comparison apparatus 99. It is noted that the amount of the target waveform data stored in the flash memory 98 can be adjusted according to the demand of the hardware design, and the amount of the corresponding target waveform data stored in the SRAM 94 can be decreased or increased. For example, to store six target waveform data to the SRAM 94, the six target waveform data can be pre-stored in the flash memory 98. Preferably, the SRAM 94 capable of storing the six target waveform data can be provided in an application chip circuit. For example, supposing one target waveform data needs a memory capacity of 16 bytes, six target waveform data then need a memory capacity of 96 bytes to very slightly increase the cost of the circuit in the chip circuit.

By pressing a button on the IR remote control (not shown), the IR waveform, i.e., the IR modulated waveform, is transmitted to and received by an IR receiver. The IR receiver then demodulates the IR modulated waveform to generate the remote control command waveform, which is sent to the slicer 92 to generate the sliced waveform data, i.e., the digital waveform data. Preferably, the digital waveform data is converted from a unit of bit to a unit of byte via the serial-to-parallel signal apparatus 921 and is then stored to the SRAM 93. In the embodiment, when the universal IR receiving apparatus 90 operates in the sleep mode for power saving, it awakens from the sleep mode if the comparison result of the comparison apparatus 99 indicates that the received digital waveform data and the target waveform data are the same, or else it continues to stay in the sleep mode. The present invention assures that the switching operation between the sleep mode and the normal mode works properly for various IR waveform standards currently in use. According to the above, those skilled in the art can make modifications without departing from the scope and spirit of the invention. For example, when the number of the SRAM 94 is increased, one can correspondingly increase the number of comparators in the comparison apparatus 99 to compare in parallel or use a single comparator to compare in sequence.

In another embodiment, the universal IR receiving apparatus 90 can be utilized not only to awaken the system from the sleep mode, but also to realize all possible functions on the remote control by recording the corresponding target waveform data for all buttons, so that the universal IR receiving apparatus 90 can be adaptive to all remote control systems without requiring system manufacturers and chip providers to modify corresponding hardware. In the normal mode, remote control waveforms corresponding to all buttons on the remote control are recorded as the corresponding target waveform data. When one presses one of the buttons to generate the corresponding remote control command waveform, the sliced waveform data is compared with the target waveform data, and the system operates correspondingly in response to the comparison result. For example, by pressing a proper button on the television remote control, the television channel or the volume is switched.

From the above, the target waveform data for awaking the system can be pre-recorded in the non-volatile memory, e.g., a flash memory. The flash memory is an electrically erasable programmable read-only memory (EEPROM) that can be repeatedly erased and written. Therefore, for different remote control system manufacturers, chip providers can record different target waveform data for awakening the system without needing to modify the hardware architecture, so as to offer an advantage of flexible button design that can even record all possible buttons and combinations as desired. The IR receiving apparatus in this embodiment can be realized at the receiving end of the IR remote control, such as the IR receiving apparatus in a liquid crystal display (LCD) television. With the foregoing embodiments, it is demonstrated that the present invention is capable of power-saving for electronic products in the sleep mode and assuring that the electronic products function properly under variously IR waveform standards. Accordingly, by providing an advantage of flexibility, chip providers need not modify hardware architectures for individual remote control system manufacturers and nor increase the production cost of chip providers. More specifically, through a power-saving hardware approach, the present invention can awaken a system that can then be operated via remote control operation, thereby rendering design flexibilities for both software and hardware.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A universal IR receiving apparatus, comprising:

a slicer, for slicing a remote control command waveform to digital waveform data;

a non-volatile memory, for pre-storing target waveform data;

a volatile memory, for storing the digital waveform data and the target waveform data; and a comparison apparatus, coupled to the volatile memory, for comparing the digital waveform data with the target waveform data to generate a comparison result, wherein, when the universal IR receiving apparatus operates in a sleep mode for power saving, the universal IR receiving apparatus awakens from the sleep mode when the comparison result indicates that the received digital waveform data and the target waveform data are the same, and wherein the universal IR receiving apparatus continues in the sleep mode otherwise, and wherein the volatile memory operates at a first clock speed in connection with storing the digital waveform from the slicer, and the volatile memory operates at a second clock speed, faster than the first clock speed, in connection with comparing the digital waveform data with the target waveform data.

2. The IR receiving apparatus according to claim 1, wherein the non-volatile memory is a flash memory.

3. The IR receiving apparatus according to claim 1, further comprising a microcontroller, coupled between the volatile memory and the non-volatile memory, for storing the target waveform data from the non-volatile memory to the volatile memory.

4. The IR receiving apparatus according to claim 3, wherein the microcontroller is a microprocessor.

5. The IR receiving apparatus according to claim 1, wherein the volatile memory is an SRAM.

6. The IR receiving apparatus according to claim 1, wherein the comparison apparatus comprises a comparator.

7. The IR receiving apparatus according to claim 1, wherein the comparison apparatus comprises a plurality of comparators.

8. The IR receiving apparatus according to claim 1, further comprising an awakening circuit coupled to the comparison apparatus for determining whether to awaken a system in response to the comparison result.

9. The IR receiving apparatus according to claim 1, further comprising another volatile memory, coupled to the comparison apparatus, for storing another target waveform data.

10. The IR receiving apparatus according to claim 9, wherein the comparison apparatus compares the digital waveform data with the target waveform data to generate the comparison result and compares the digital waveform data with the another target waveform data to generate another comparison result.

11. The IR receiving apparatus according to claim 1, further comprising a serial-to-parallel signal apparatus coupled between the slicer and the volatile memory, the digital waveform data having a serial format, and the serial-to-parallel signal apparatus converting the digital waveform data from the serial format to a parallel format.

12. The IR receiving apparatus according to claim 1, further comprising an IR receiver coupled to the slicer, for receiving and demodulating an modulated IR waveform to generate the remote control command waveform.

13. A universal IR receiving method, comprising:

receiving a remote control command waveform;

slicing the remote control command waveform to digital waveform data;

comparing the digital waveform data with target waveform data to generate a comparison result; and when a system is operating in a sleep mode for power saving, causing the system to awaken from the sleep mode when the comparison result indicates that the received digital waveform data and the target waveform data are the same, and causing the system to stay in the sleep mode otherwise, wherein the digital waveform is stored in a volatile memory that operates at a first clock speed in connection with storing the digital waveform resulting from the slicing, and wherein the volatile memory operates at a second clock speed, faster than the first clock speed, in connection with comparing the digital waveform data with the target waveform data.

14. The IR receiving method according to claim 13, further comprising controlling a corresponding operation of the system in response to the comparison result.

15. The IR receiving method according to claim 13, further comprising converting the digital waveform data from a serial format to a parallel format after the slicing step.

16. The IR receiving method according to claim 13, further comprising storing a reference remote control command waveform as the target waveform data.

17. The IR receiving method according to claim 13, wherein the comparison step compares the digital waveform data with the target waveform data and another target waveform data to generate the comparison result.

18. The IR receiving method according to claim 13, further comprising storing the target waveform data from a non-volatile memory to a volatile memory.

19. An IR waveform recording method for recording a target waveform data, comprising:

receiving a remote control command waveform;

slicing the remote control command waveform to digital waveform data;

storing the digital waveform data as the target waveform data in a volatile memory;

storing the target waveform data in a non-volatile memory;

comparing the digital waveform data with target waveform data to generate a comparison result; and when a system is operating in a sleep mode for power saving, causing the system to awaken from the sleep mode when the comparison result indicates that the received digital waveform data and the target waveform data are the same, and causing the system to stay in the sleep mode otherwise, wherein the volatile memory operates at a first clock speed in connection with storing the digital waveform from resulting from the slicing, and the volatile memory operates at a second clock speed, faster than the first clock speed, in connection with comparing the digital waveform data with the target waveform data.

20. The IR receiving method according to claim 13, wherein the target waveform data includes first target waveform data and second target waveform data different from the first target waveform data, wherein the system is caused to awaken from the sleep mode when the comparison result indicates that the received digital waveform data and the first target waveform data are the same, and wherein the system is caused to perform an operation other than awakening from the sleep mode when the comparison result indicates that the received digital waveform data and the first target waveform data are the same.

* * * * *